May 9, 1933.  C. J. MALM ET AL  1,908,524
PROCESS FOR PRODUCTION OF LOW VISCOSITY CELLULOSE ACETATE
Filed Dec. 16, 1929
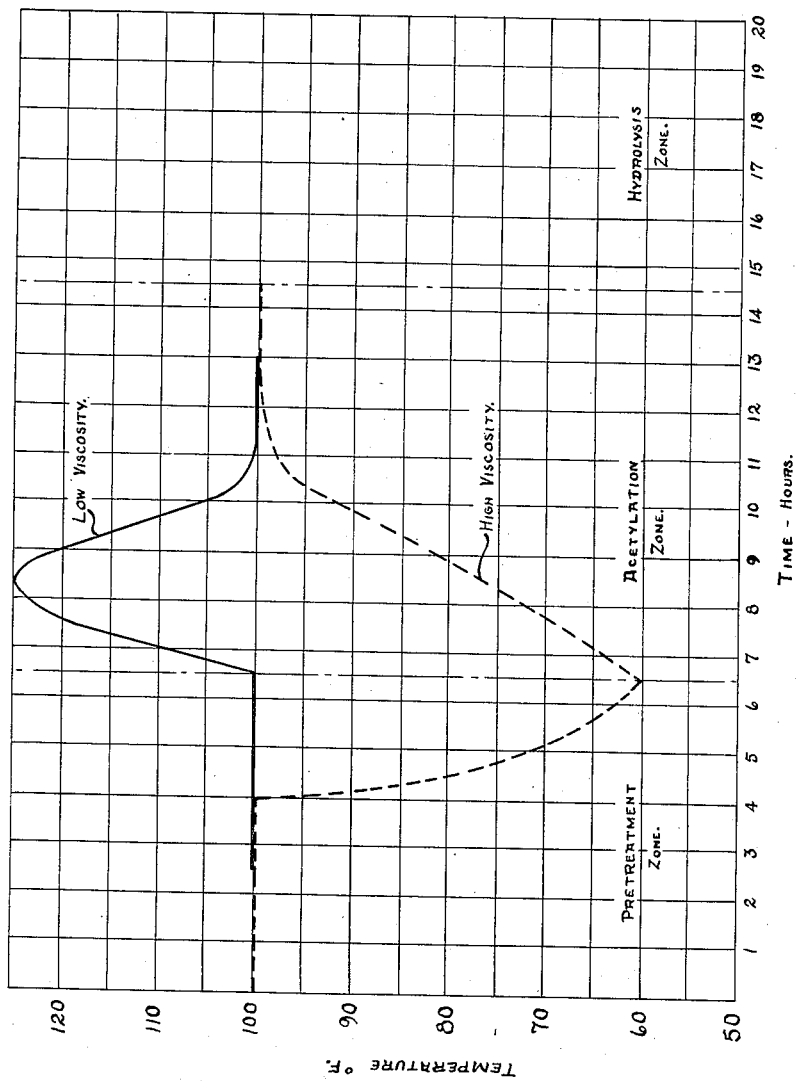
Carl J. Malm
Arne Anderson
Inventors Patented May 9, 1933

1,908,524

UNITED STATES PATENT OFFICE

CARL J. MALM AND ARNE ANDERSEN, OF ROCHESTER, NEW YORK, ASSIGNORS TO EASTMAN KODAK COMPANY, OF ROCHESTER, NEW YORK, A CORPORATION OF NEW YORK

PROCESS FOR PRODUCTION OF LOW VISCOSITY CELLULOSE ACETATE

Application filed December 16, 1929. Serial No. 414,333.

This invention relates to a process for the production of cellulose acetate and particularly to a process for the production of cellulose acetate of low viscosity, and products having good strength and other beneficial properties.

A number of methods have been suggested in the past for producing cellulose acetate of low viscosity, such as, (1) by subjecting the cellulose to a very strong pretreatment whereby the cellulose is broken down to a degree where even comparatively mild acetylation and hydrolysis gives a product of low viscosity, (2) by carrying out the acetylation at high temperatures in the presence of comparatively strong catalysts, thereby simultaneously causing a breakdown of the cellulose and a lowering of the viscosity of the cellulose acetate, (3) by carrying out the hydrolysis of the cellulose acetate at high temperatures in the presence of strong mineral acids and (4) by subjecting the finished acetate to treatment with oxidizing agents either while still in solution or after precipitation and drying. All of these methods will give a low viscosity cellulose acetate, but the product is usually of very low strength and unsuited for the production of products such as thin films of cellulose acetate which are to be used in the making of photographic film or the like.

It is an object of our invention, therefore, to produce a cellulose acetate by a relatively simple method, which cellulose acetate will have a low viscosity, and at the same time the product will have sufficient strength and other beneficial properties to be useful for most purposes for which cellulose acetate is normally intended in the industry.

The complete process which we have developed comprises the pretreatment of cellulose with acetic acid and a catalyst to prepare the cellulose for better acetylation, followed by an acetylation process which is conducted at a relatively high temperature during the first part of the acetylation, after which the acetylation is continued for a time at what might be termed a normal acetylation temperature; the cellulose acetate so produced may then be hydrolyzed in known manner.

Although we do not wish to be limited by example, we set forth the following as an illustration of the manner in which our invention may be carried out by those skilled in the art: 100 pounds of cellulose such as cotton linters may be added to a mixture comprising about 700 pounds of acetic acid, 450 cc. of sulfuric acid and 1,350 cc. of phosphoric acid, the mixture being kept at approximately 100° F. for a period of about four hours. Further pretreatment may be resorted to, but the foregoing is sufficient for the purposes of our invention. To the foregoing mixture may then be added about 300 pounds of 85% acetic anhydride and the temperature of the reacting mixture allowed to rise to from 120° F. to 150° F. within from approximately ten to twenty minutes. The temperature to which the reacting mixture is allowed to rise depends upon the viscosity that is desired. For instance, if it be desired to lower the viscosity of the acetate considerably, the temperature may be allowed to rise to as high as 150° F. However, if it is not desired to lower the viscosity of the acetate to such an extent, the temperature may be permitted to rise only to as high as, for instance, 120° F. After about one and one-half to two hours of such acetylation, it will be noted that the cellulose is substantially all acetylated, this being most readily determined by the fact that the fibres of the cellulose go into solution. At this point the temperature of the acetylation bath is brought down to approximately 100° F. where it is maintained until the dope is entirely free from grain. This usually requires from two to three more hours. In this way a very thin homogeneous dope is obtained.

It is usually desired to change the cellulose acetate so produced to an acetate of acetone solubility and hydrolysis of the mixture will, therefore, usually be resorted to. If such be the case, there may then be added to the acetylation bath a mixture of about 120 pounds of water and 200 pounds of acetic acid, the hydrolysis mixture being kept at approximately 100° F., until an acetate with the desired acetyl content is obtained. This may require from four to fourteen days, depending upon the acetyl content which is desired. Upon precipitation of the product so produced, it will be found that it is not only acetone soluble, but has a very low viscosity in this solvent as well as good strength and flexibility when coated in the form of a thin sheet for photographic purposes or for making wrapping tissue or the like. Such material also has utility in the lacquer industry in the production of cellulose acetate lacquers of high durability.

It will thus be noted that by the above process we have not only produced a product of low viscosity, good strength and flexibility, but that we have accomplished acetylation in a much shorter time than that normally required.

Obviously numerous changes can be made in the proportions of the ingredients employed in the pretreatment, acetylation or hydrolysis baths or mixtures without materially affecting the utility of this process, it being principally necessary only that the first part of the acetylation be conducted at a higher temperature than would be normally employed and that the remainder of the acetylation be conducted at normal acetylation temperature or even slightly less than such normal temperature.

For instance, the catalyst need not be composed of both sulfuric and phosphoric acids, but may be sulfuric alone, and the proportions of glacial acetic acid and acetic anhydride to cellulose may differ widely and may follow the pretreatment and acetylation formulæ set forth in the early patents of such inventors as Lederer, Mork and Lindsay.

The accompanying drawing shows quite clearly, in a graphical way, how our acetylation step compares with what might be termed as normal acetylation according to previous practice, the "low viscosity" curve indicating the temperature-time course of our acetylation and the "high viscosity" curve indicating the temperature-time course of previous acetylation practice. The pretreatment, acetylation and hydrolysis zones are separated by vertical dot and dash lines, the first dot and dash line indicating the point at which the acetylation mixture is added in both cases. It will thus be observed that we pretreat at what may be termed for purposes of this application a normal pretreatment temperature of approximately 100° F., then initially acetylate appreciably above 100° to 110° F. which may be termed normal acetylation temperatures and then continue acetylation at approximately normal acetylation temperatures, followed by hydrolysis; this language is embodied in the claims appended hereto.

What we claim as our invention and desire to be secured by Letters Patent of the United States is:

1. In a process for the production of low viscosity cellulose acetate, the acetylation step which comprises permitting the temperature of the reaction to rise above normal acetylation temperature for a short period during the esterification and then completing the esterification at normal acetylation temperature.

2. In a process for the production of low viscosity cellulose acetate, the acetylation step which comprises initially acetylating the cellulose for a short period at a temperature higher than normal acetylation temperatures and then completing the acetylation at normal acetylation temperature.

3. In a process for the production of low viscosity cellulose acetate, the acetylation step which comprises initially acetylating the cellulose for a short period at a temperature of approximately 110° F. to 150° F., and then completing the acetylation at a temperature of approximately 100° F.

4. In a process for the production of low viscosity cellulose acetate, the acetylation step which comprises initially acetylating the cellulose for a short period at a temperature of approximately 120 to 150° F. and then completing the acetylation at a temperature of approximately 100° F.

5. In a process for the production of low viscosity cellulose acetate, the acetylation step which comprises initially acetylating the cellulose for about 1 to 2 hours at a temperature of approximately 120 to 150° F. and then completing the acetylation at a temperature of approximately 100° F.

6. A process for the production of low viscosity cellulose acetate comprising pretreating cellulose with a lower fatty acid and a catalyst at a temperature approximately corresponding to normal acetylation temperature, partially acetylating the thus pretreated cellulose at a temperature higher than normal acetylation temperature and then completing the acetylation at approximately normal acetylation temperature.

7. A process for the production of low viscosity cellulose acetate comprising pretreating cellulose with a lower fatty acid at a temperature approximately corresponding to normal acetylation temperature, partially acetylating the thus pretreated cellulose at a temperature higher than normal acetylation temperature. then completing the acetylation at approximately normal acetylation temperature.

8. A process for the production of low viscosity cellulose acetate comprising pretreating cellulose with a lower fatty acid and a catalyst at a temperature approximately corresponding to 100° F., partially acetylating the thus pretreated cellulose at a temperature of approximately 110° F. to 150° F., and then completing the acetylation at approximately 100° F.

9. A process for the production of low viscosity cellulose acetate comprising pretreating cellulose with a lower fatty acid at a temperature approximately corresponding to 100° F., partially acetylating the thus pretreated cellulose at a temperature of approximately 110° F. to 150° F., then completing the acetylation at approximately 100° F.

Signed at Rochester, New York, this 10th day of December, 1929.

CARL J. MALM.
ARNE ANDERSEN.